Dec. 6, 1932.  H. E. MORTON  1,889,930
DRAW-CUT SHAPER TABLE
Filed Jan. 25, 1928    4 Sheets-Sheet 2

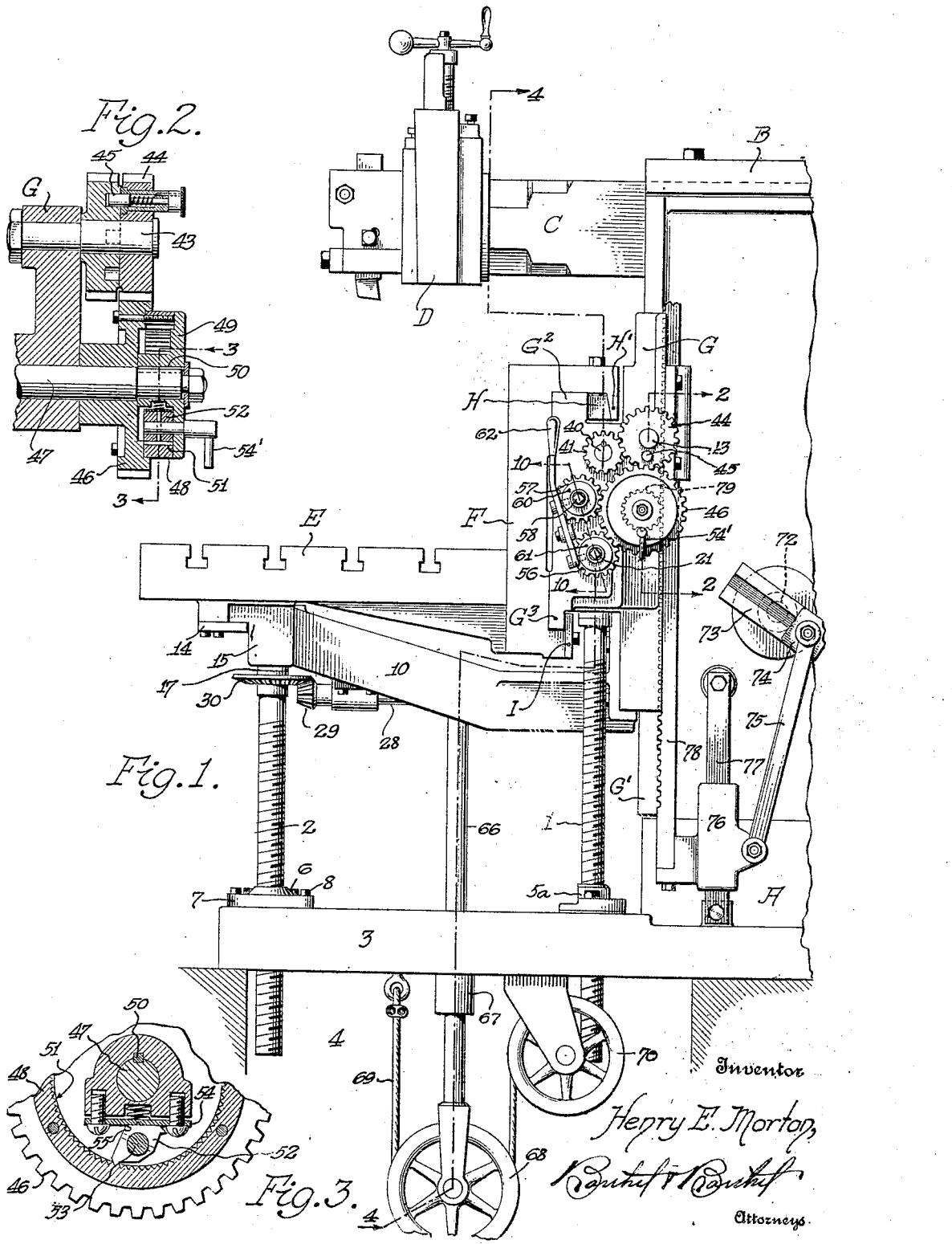

Inventor
Henry E. Morton,
Attorneys

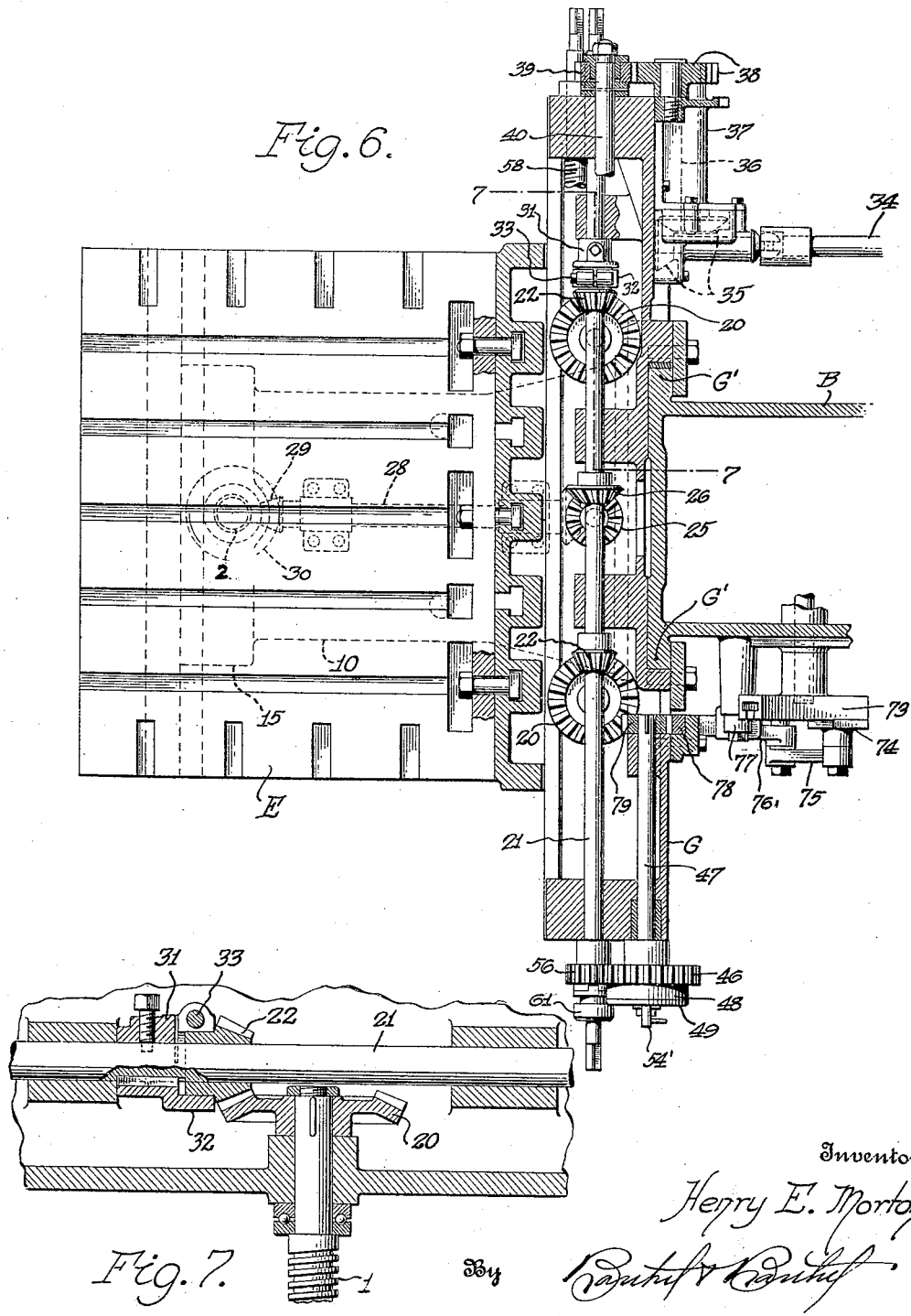

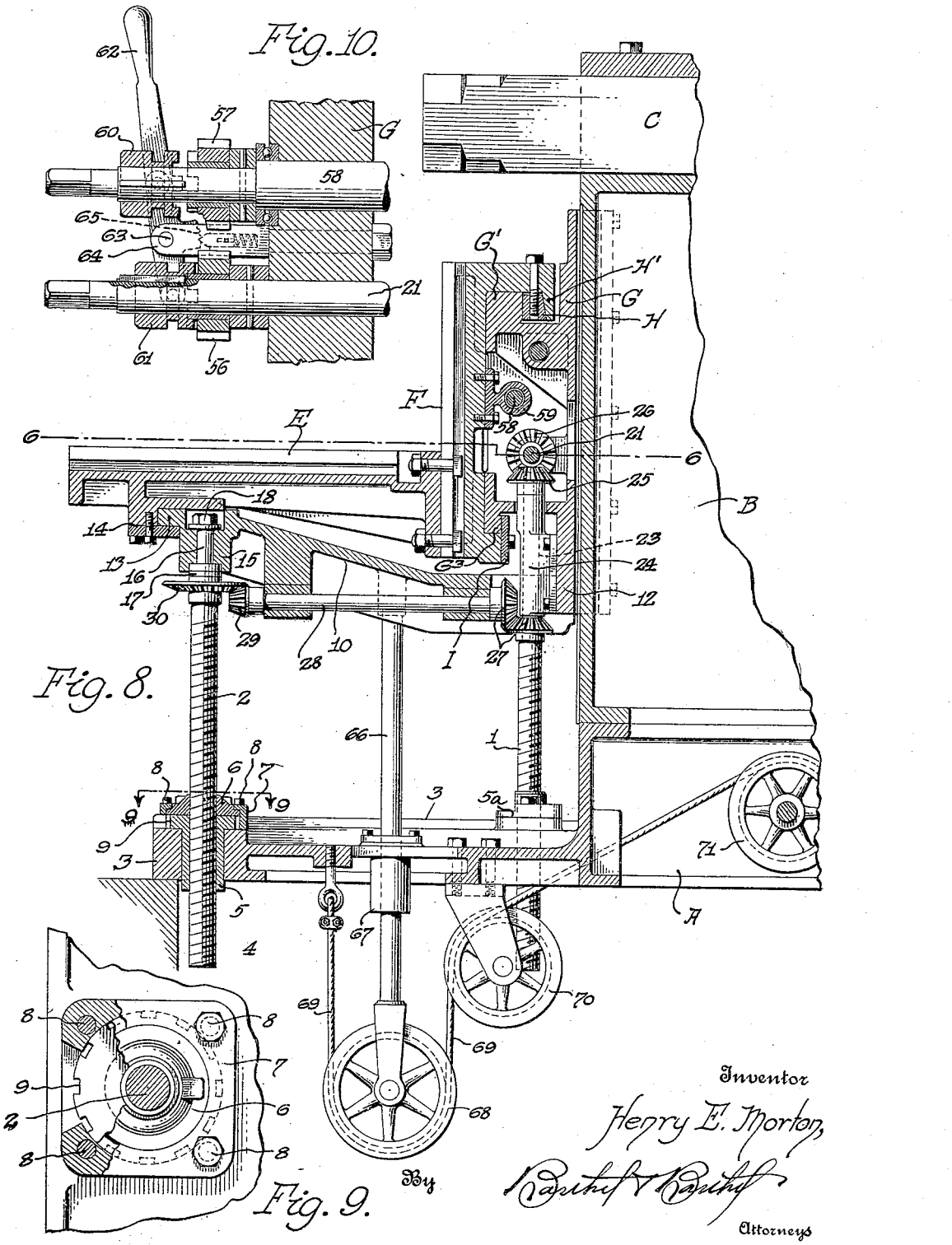

Patented Dec. 6, 1932

1,889,930

UNITED STATES PATENT OFFICE

HENRY E. MORTON, OF MUSKEGON HEIGHTS, MICHIGAN

DRAW-CUT SHAPER TABLE

Application filed January 25, 1929. Serial No. 249,282.

This invention relates to metal working machines of the heavy duty type and more particularly to a work supporting table and power means for operating and rigidly supporting the same, said table being particularly adapted for use in connection with the type of machine commonly known as a draw-cut shaper for machining very large, heavy parts.

An object of the invention is to provide an adjustable table for such machines, adapted to support very heavy loads without sagging, yielding or twisting, thus giving a maximum of accuracy, and to provide power operated means for adjusting said table either horizontally or vertically while so supported, and with a continued movement for adjustment or an intermittent movement for advancing the cut. It is also an object to provide certain other new and useful features in the construction, arrangement or combination of parts, all as hereinafter more fully described.

With the above and other ends in view, the invention consists in the matters hereinafter set forth and more particularly pointed out in the appended claims, reference being had to the accompanying drawings in which Figure 1 is an end elevation of a machine illustrative of an embodiment of the invention and of its application to that type of metal working machine, commonly known as a draw-cut shaper;

Fig. 2 is a sectional detail, substantially upon the line 2—2 of Fig. 1;

Fig. 3 is a sectional detail upon the line 3—3 of Fig. 2;

Fig. 6 is a horizontal section, substantially upon the line 6—6 of Fig. 8;

Fig. 7 is an enlarged sectional detail upon the line 7—7 of Fig. 6;

Fig. 8 is a central vertical section substantially upon the line 8—8 of Fig. 4;

Fig. 9 is a sectional detail, on the line 9—9 of Fig. 8 with parts of the adjusting nut there shown, broken away and in section, and Fig. 10 is a sectional detail on the line 10—10 of Fig. 1.

Figure 4:
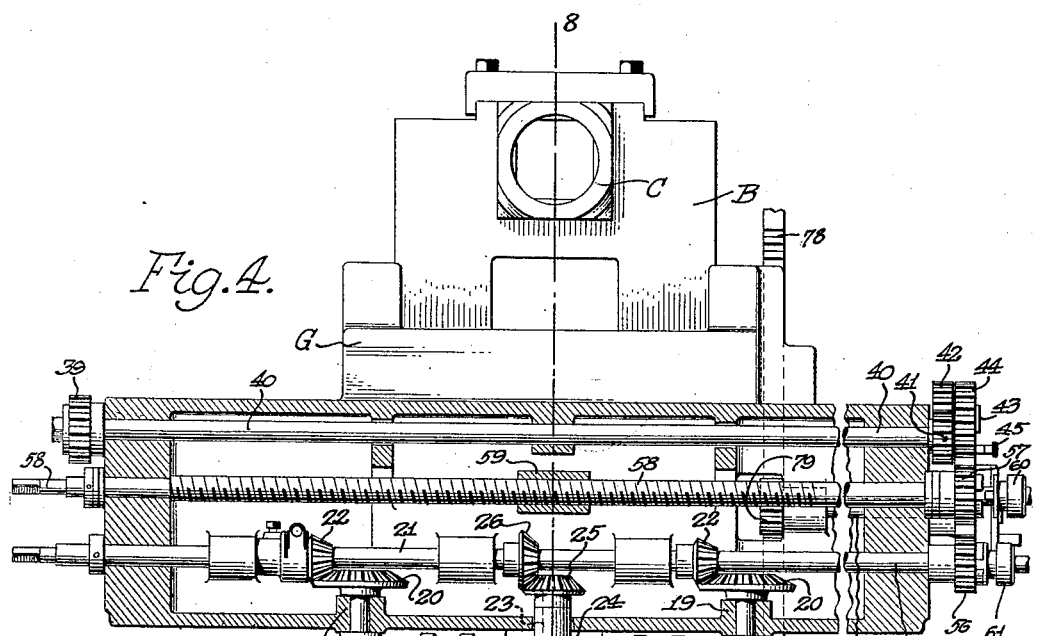
Fig. 4 is a vertical section substantially upon the line 4—4 of Fig. 1.

Metal working machines adapted to finish large castings and machinery parts, are usually provided with work tables supported laterally of the table by a vertically adjustable member, and the weight of the table and work is thus supported in overhanging relation to the adjustable table support. When very heavy castings are placed on such a table for machining, the table or its support is very liable to spring or yield slightly and thus destroy the accuracy of the operation of the machine, and the main object of the present invention is to overcome this effect by providing a very rigid support directly beneath the table adjacent its outer unsupported side and also adjacent its ends, thereby making such a table perfectly rigid, but at the same time adjustable.

For the purpose of illustration, the mechanism embodying the present invention, is shown as applied to a metal working machine of the class known as draw-cut shapers, but it will be understood that the present invention may be applied to other machines wherever extreme rigidity of the work table, together with adjustability thereof, is desirable. In the drawings A indicates the usual base of the shaper, B the pedestal or body which is provided with the usual ways or bearings for the horizontally reciprocable ram C having the usual tool carrying head D reciprocable with the ram over a work table E, which table is rigidly secured at its rear side to an apron F, said apron being carried by a horizontally disposed rail indicated as a whole by the letter G, and said rail is mounted for vertically adjustable sliding movement upon guides or ways G' formed upon the pedestal or body B with the rail in firm sliding contact with the vertical face of the body. The rail is also formed with top and bottom guides G2 and G3, and the apron F is formed at its upper end to engage over the guide G2 with a take-up wedge H interposed between the side of the guide and the lip H' on the apron. The lower end of the apron is provided with a guide I to engage over the guide rib G3 on the rail and thus the apron is rigidly supported by the rail but free to slide longitudinally thereon.

The table E which is formed in its upper surface with the usual T-slots to facilitate the bolting of the work in place upon the table, projects laterally from the vertical face of the apron F, in which apron face is the usual vertical T-slots to facilitate the securing of the work in proper relation to the face of the apron. Where the table E is otherwise unsupported, when a very heavy casting or other part to be machined is placed thereon, this table and its movable apron upon which it is supported, may spring or be deflected slightly under the heavy strains applied during the machining operation and under the force applied by the ram in making a cut. Any such slight deflection will, of course, destroy the accuracy of the machining operation and to rigidly support the table and apron, and also the supporting rail, and at the same time permit of the horizontal and vertical adjustment of the table relative to the ram, a pair of vertical screw shafts 1 is provided beneath the rail G, and a third supporting vertical screw shaft 2 is provided beneath the table toward the outer free edge of the table. A bed or base 3 which may be an integral part and extension of the base A, is provided to extend outwardly beneath the table over a pit 4 in the foundation upon which the machine is set. This bed 3 is formed with openings through which the screw shafts extend, and mounted within the opening for the shaft 2, is a nut 5 internally screwthreaded to engage the screw thread of the shaft, so that by turning the shaft it may be run up or down through the nut, the nut forming the support for the shaft. To prevent the nut 5 from turning when the shaft is turned, a cap 6 is placed thereover and this cap is held down firmly against the end of the nut by means of a collar 7 secured by bolts 8 passing therethrough and into the base 3. The flange or head of the nut 5 is provided with a series of notches 9 and therefore by loosening the bolts 8 to relieve the nut 5 from the pressure of the cap 6, the nut may be rotated by means of a suitable tool engaged in the notches 9, and thus said shaft 2 may be adjusted vertically relative to the shaft 1 in its bearing nut. Nuts 5a are provided for the shafts 1, said nuts being secured within the openings in the base, in any suitable manner to hold them against turning with the shaft.

A supporting frame which is indicated as a whole by the numeral 10, is rigidly secured at one end by a series of bolts 11, to downwardly extending guide arms 12 formed integral with the rail G, and this frame 10 extends outwardly beneath the table E and is provided at its outer end with a bearing rib 13 which is engaged by a suitably guideway 14 on the lower side of the table extending longitudinally of the table. The outer end of this supporting frame 10 is formed with a bearing 15 to receive the upper reduced end portion 16 of the shaft 2, suitable thrust collars 17 being interposed between the lower end of the bearing 15 and the shoulder on the shaft formed by the reduction in the diameter thereof, and a nut 18 is applied to the upper end of the shaft within a recess in the frame to firmly connect the shaft to the frame.

A bearing 19 is provided for each of the shafts 1, said bearings being formed in the lower side of the rail G to receive the upper reduced end portions of the shafts which thus form rigid adjustable supports for the rail. Secured to the upper end of each of the shafts 1 is a beveled gear 20 and mounted within suitable bearings in the rail G is a horizontally extending shaft 21 having secured thereon beveled pinions 22 in mesh with the gears 20. The shaft 21 extends the full length of the rail G with its ends projecting through and beyond the ends of the rail, and suitable power transmitting means hereinafter described, is provided for transmitting power to one end of this shaft for turning the same and thus through the beveled gears 20 and 22, rotating the screw shafts 1.

Power is also transmitted from the shaft 21 for turning the screw shaft 2, by means comprising a short vertical shaft 23 mounted in a bearing bracket 24 secured to the downwardly extending portion of the rail G with a beveled gear 25 on the upper end of this short shaft in mesh with a like gear 26 on the shaft 21. The lower end of the shaft 23 is also provided with a beveled gear 27 to engage a like gear on the inner end of a horizontal shaft 28 mounted in suitable bearings upon the frame 10 and extending forwardly to the screw shaft 2 where it is provided with a pinion 29 to engage a beveled gear 30 on said shaft 2. Power for turning all three of the supporting shafts 1 and 2 is thus transmitted from the shaft 21 carried by the rail and all of these supporting shafts are turned in a like direction and to the same extent so that the table, its apron and the entire supporting rail, will be evenly and accurately raised or lowered by the turning of the screw shafts, which shafts at the same time form rigid and accurate supports for the rail, and apron and table attached thereto.

Should one of the supporting screw shafts of the pair 1 get out of adjustment relative to the other, due to wear or from some other cause, and thus give unequal support, one of these shafts may be adjusted relative to the other by the means shown in detail in Fig. 7. This means comprises a collar 31 secured to the shaft 21 in any suitable manner, to turn therewith, said collar carrying a split flange 32 partially severed from the collar so that it may be clamped by means of a clamping screw 33, about the hub of the gear 22 and thus secure the gear to the shaft to turn therewith. When it is desired to adjust one of the supporting shafts 1 to the other, the gear 22 is released by releasing the clamping screw and then turning the gear to rotate the gear 20 and shaft 1. After the proper adjustment has been made, the gear 22 is again secured to its shaft by the clamping flange 32.

Figure 5:
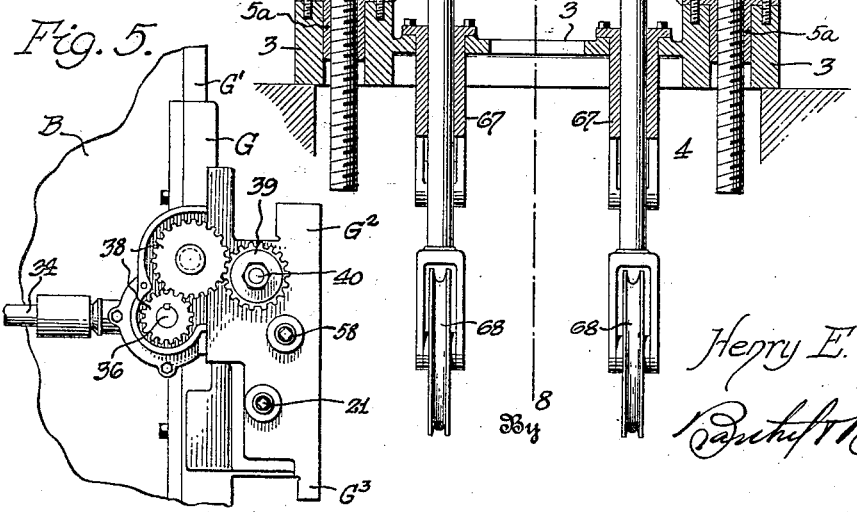
Fig. 5 is a detail showing in end elevation, a portion of the left hand end of the machine as shown in Fig. 4.

Power for adjusting the supporting shafts 1 and 2 and for adjusting the table and apron horizontally upon the rail G, is transmitted from any suitable part of the draw-cut shaper operating mechanism as through a shaft 34 shown in Fig. 6, motion being transmitted from this shaft through beveled gears 35 to a short horizontal shaft 36 mounted within a suitable bearing bracket on the back of the rail G at one end thereof and from the shaft 36 motion is transmitted through spur gears 38, shown in detail in Fig. 5, to a gear 39 on the projecting end of a shaft 40 mounted in suitable bearings in the rail G and extending longitudinally thereof parallel with the shaft 21. On the opposite end of the shaft 40 is a gear 41 outside the end of the rail G and this gear is in mesh with an idler gear 42 shown in detail in Fig. 2, loosely mounted on a fixed stub shaft 43 with a like gear 44 also loosely mounted on the stub shaft alongside the gear 42. A locking pin 45 carried by the gear 44 is adapted to engage openings in the gear 42 for the purpose of locking the two gears together, and this gear 44 is in mesh with the gear 46 loosely mounted upon the projecting end of a short shaft 47 mounted in bearings in the rail G and extending inwardly from the end thereof to a point adjacent one of the guides G' for the rail. Secured to the outer side of the gear 46 is a ring 48 (see Fig. 2), and a disk 49 closes the outer end of this ring and has a hub which is secured in any suitable manner to the end of the shaft 47, as by means of a spline 50. The inner surface of the ring 48 is formed with a series of notches or teeth 51 (see Fig. 3) and carried by the hub of the disk 49 is a double pawl 52 mounted upon a shaft 53 extending through the disk and provided with a handle 54' at its outer end by means of which the double pawl 52 may be turned to bring either of its dogs or engaging ends into engagement with the teeth 51 of the ring 48. The pawl normally rests against the spring pressed plate 54 which is notched to receive a projection 55 on the double pawl, the spring pressed plate acting to hold the pawl turned with either of its ends in engagement with the ring 48 or to hold the pawl in mid position with its projection 55 engaging the notch in the plate and with both of its ends out of engagement with the ring. The gear 46 is in mesh with a gear 56 on the outer end of the shaft 21 and is also in mesh with a gear 57 on the outer end of a screw shaft 58 which is mounted in bearings within the rail G and extends longitudinally therethrough in parallelism with the shafts 21 and 40. This shaft 58 is screwthreaded throughout a major portion of its length and engages a nut 59 or internally screwthreaded member, rigidly secured to the back of the apron F within the rail G. Turning of this screw shaft 58 will therefore, move the nut 59 along the shaft and impart a horizontal movement to the apron F and table E carried thereby. As shown in detail in Fig. 10, the hub of the gear 57 on the shaft 58 is formed with teeth to engage the toothed end of a sliding clutch 60 and the gear 56 on the end of the shaft 21 is also formed with teeth to be engaged by teeth on the end of a sliding clutch member 61, said clutch members being each keyed to their respective shafts to turn with the shaft but free to slide longitudinally thereon. A hand lever 62 is pivotally supported at 63 intermediate its ends midway between said clutches, upon a suitable yoke 64 secured to the end of the rail and this lever is operatively connected with each of the clutches 60 and 61 so that movement in one direction of the lever will throw one of the clutches out and the other in, and the reverse movement of the lever will reverse the engagement of the clutches, suitable means such as a rack and detent indicated at 65, being provided for frictionally holding the lever 62 in the position to which it is moved with either one or the other of the clutches engaged or in mid position with both of the clutches disengaged.

When power is transmitted from a moving part of the machine as described to the shaft 40, this motion will be transmitted through the gears 41, 42 and 44 when said gears 42 and 44 are locked together by means of the pin 45, and from the gear 44, motion will be transmitted through the gear 46 to one of the gears 56 or 57 when the double pawl 52 is in mid position and the gear 46 thus disconnected from the shaft 47. By throwing the clutch 60 into engagement with the gear 57, the screw shaft 58 will be rotated and the table and its apron will be moved horizontally with a continuous movement to adjust the table horizontally and bring the work thereon into proper relation with the cutting tool on the ram C. By throwing the clutch 61 into engagement with the gear 56 on the outer end of the shaft 21, said shaft will be rotated with a continuous movement and motion will be transmitted therefrom through the gears 20 and 22 to the vertical supporting shafts 1 and motion will also be transmitted from the shaft 21 through the gears 25 and 26, the short shaft 23, the gears 27, the shaft 28 and the gears 29 and 30, to the vertical supporting shaft 2. All of the vertical screw shafts will therefore be rotated simultaneously in the same direction and at the same speed to raise or lower the work table and its entire supporting mechanism. Power is therefore available to raise or lower the work the desired distance for the purpose of adjusting it relative to the cutting tool of the ram.

If found desirable, the entire weight of the table, skirt and rail together with the work upon the table, may be counterbalanced, to a degree, by providing a pair of vertically extending rods or shafts 66 which are secured or fixed at their upper ends within sockets on the frame 10, said rods extending downwardly through suitable bearings 67 on the base 3 into the pit 4 where they are provided at their lower ends with pulleys 68 over which cables 69 are led, said cables being anchored at one end to the base 3 with the loop in the cable engaging the pulleys and the remaining run of each cable being extended over idlers 70 on the base and thence to any convenient point where they are passed over other pulleys 71, and weights, not shown, hung on the free ends of the cables to partially counterbalance the weight of the table and work thereon.

When the table has been properly adjusted to bring the work into the desired relation to the cutting tool, it is desirable that the work be automatically adjusted each time a cut is made by the tool, so that the work will be in proper position at the beginning of the next cut, to be engaged by the tool, said tool of a draw-cut shaper being carried by a ram moved in a fixed path and therefore not adjustable either vertically or horizontally. In order to effect such intermittent adjustment of the work table, motion is transmitted from any suitable moving part of the draw-cut shaper which part operates in timed relation to the reciprocation of the ram, and as illustrative of such a connection, a shaft 72 of the draw-cut shaper, indicated in Fig. 1, is provided with a crank 73 upon its outer end, said crank being in the form of a slotted bar or way extended at right angles to the axis of the shaft and across the same, a block 74 being provided to slide adjustably in said way to vary the stroke of the crank, and pivotally connected to this block is a connecting rod 75 which, at its opposite end, is pivotally connected to a slide 76 guided by a suitable guide bar 77 on the side of the pedestal or casing B, said slide being secured to the lower end of a rack bar 78 guided in suitable guides for vertical movement with its teeth in mesh with a gear 79 on the inner end of the short shaft 47. A reciprocating movement is therefore imparted to the rack bar 78 by the crank 73 and this movement will turn the gear 79 and shaft 47 in first one direction and then the other, and the gear 44 being disconnected from the gear 42 by withdrawal of the pin 45, this motion will not be imparted to the drive shaft 40. If the double ratchet 52 is in neutral position at this time, no motion will be transmitted from the shaft 47 to the gear 46, but if it is desired that this intermittent feed motion be transmitted during the movement of the rack bar 78 in one direction, the double ratchet 52 is swung by means of its handle 54 to engage one of its ends with the internal teeth on the ring 48 which is carried by the gear 46, and therefore, during the turning of the shaft 47 in the direction for which the ratchet is set, the gear 46 will be rotated in that direction, and during the rotation of the shaft in the opposite direction, the ratchet will snap over the internal teeth of the ring and the gear will not be turned. Therefore during the travel of the rack bar 78 in one direction the gear 46 will be turned and during its travel in the opposite direction the gear will stand still. If it is desired that the gear 46 be rotated intermittently in a reverse direction, this is accomplished by an opposite adjustment of the ratchet 52.

With the parts arranged to transmit motion intermittently to the gear 46 as above described, by manipulating the lever 62 this intermittent motion may be imparted either to the screw shaft 58 for moving the table horizontally, or to the shaft 21 for raising or lowering the table, and as this intermittent motion is in timed relation to the operation of the ram, the work may be moved over for the desired distance for the cut after each cutting stroke of the ram where a horizontal surface is being formed on the work, or the work may be raised relative to the cutting tool after each cutting stroke of the ram where a vertical surface is being formed on the work, and therefore, the work may be automatically fed to the cutter, and the work supporting table will at all times be rigidly supported by the supporting screw shafts.

Changes in the construction and arrangement of parts are contemplated to suit the particular metal working machine to which the invention is to be applied, and I do not therefore, wish to limit myself to the construction and application shown.

Having thus fully described my invention what I claim is:

1. In a metal working machine having a pedestal provided with vertical guides and a power shaft, the combination of a horizontally disposed rail guided for vertical adjustment by said guides on said pedestal, an apron mounted on said rail for vertical adjustment therewith and for horizontal adjustment relative thereto, a table of extended upper surface area secured along one edge to said apron, a supporting frame rigid at its inner end with the lower end of said rail and extending outwardly beneath said table, said table being operatively connected with said frame at the outer end thereof for horizontal adjustment with said apron relative to said frame and rail, vertically adjustable screw shafts beneath said rail and frame for supporting the load of said rail, apron and table and for adjusting the same vertically, parallel shafts mounted in bearings on said rail and extending longitudinally thereof, one of said shafts being screwthreaded, a nut on said apron engaging said screw shaft on said rail, means for transmitting motion from the other of said shafts on said rail to turn said vertically adjustable screw shafts, means for transmitting motion from said power shaft on said pedestal to said parallel shafts on said rail, and means for connecting said last named motion transmitting means to either of said parallel shafts.

2. In a metal working machine as characterized in claim 1, and including a reciprocable member driven by power from said power shaft, and means for transmitting motion from said reciprocable member including a one-way driving device for imparting an intermittent motion to said parallel shafts on said rail.

In testimony whereof I affix my signature.
HENRY E. MORTON.